3,307,500
ROLL-ADJUSTING ATTACHMENT ON DOUGH-ROLLING MACHINE
Gustave A. Seewer, Heiminwilstrasse 42, Burgdorf, Switzerland, and Karl Schrauf, Gisingen, near Feldkirch, Vorarlberg, Austria; said Schrauf assignor to said Seewer
Filed Jan. 17, 1964, Ser. No. 338,353
Claims priority, application Switzerland, Jan. 22, 1963, 741/63
10 Claims. (Cl. 107—12)

The present invention relates to a roll-adjusting attachment on a machine for rolling dough by means of a pair of rolls, comprising means for setting or adjusting one roll with respect to the other, and a control means which on being actuated from a predetermined initial position operates switching means which in turn operates an electric motor for driving at least one of the two rolls.

To simplify the operation of the dough-rolling machine it is advantageous to bring about the desired decrease in the nip or roll gap on actuation of the control means out of its initial position.

Such advantage is attained according to the invention wherein the attachment comprises a step-by-step switching means responsive to said actuation of the control means and adapted to automatically set or incrementally adjust one of said two rolls to decrease the roll gap.

In a preferred embodiment, the attachment comprises manually adjustable means for biasing said step-by-step switching means with a view of altering the effective quantity thereof.

One preferred embodiment of the invention is shown by way of example in the drawing in which FIG. 1 shows a longitudinal section through that portion of the dough-rolling machine to which the roll-adjusting attachment belongs, on the line I—I of FIG. 2, the upper roll occupying the upper terminal position;

Figure 1:
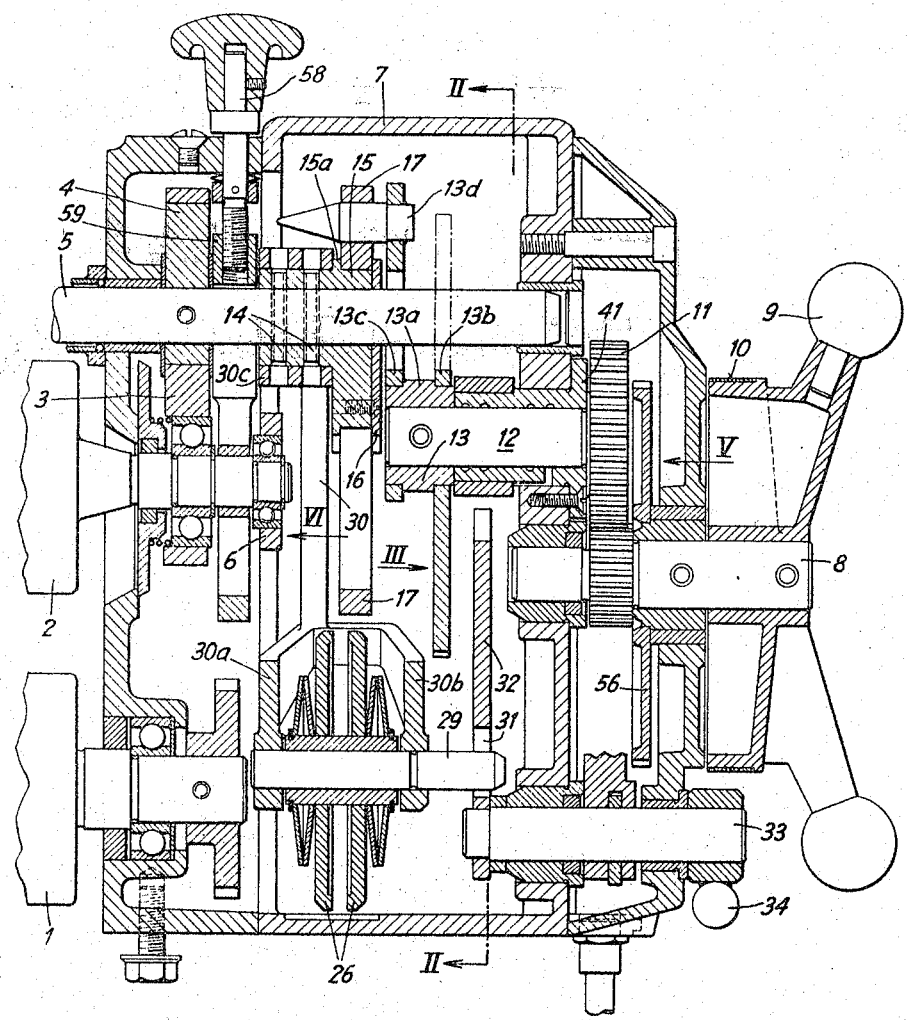

Numeral 1 denotes the lower roll and numeral 2 the upper roll of a dough-rolling machine that partially is known per se and partially also is described, for example, in British Patent No. 919,750 filed April 18, 1961. The lower roll 1 rotates about a fixed axis and is driven by a reversible electric motor at the end not shown in FIG. 1. The upper roll 2 is journaled in known manner in supporting members 3 which in turn are freely rotatable on eccentric discs 4 that are fixed to a common adjusting shaft 5. The upper roll 2 further is guided by means of rockers 6 on a housing 7 or respectively on a casing positioned at the other ends of said rolls and surrounding the motor drive.

*Upper-roll adjustment by hand-wheel actuation*

In housing 7 is a rotatably mounted pinion shaft 8 to which is fixed a freely accessible handwheel 9. The latter is provided with a scale 10 that is movable opposite an index mark on said housing and indicates the roll-gap or nip size. The pinion shaft 8 carries a pinion which meshes with a gear wheel 11 that is fixed to a shaft 12. A slider 13 comprising a boss 13a and two flat parts 13b and 13c welded thereto, also is fixed to shaft 12, and a slider pin 13d is welded to part 13c. Fastened to the adjusting shaft 5 with the aid of locking pins 14 is an adjusting part 15 which has two concentric sides (FIG. 2) shaped in circular arcs, the part 15 being situated between a raised rim 15a and a projecting rim of a plate 16 screwed thereto. A transfer rocker 17 freely rotatably mounted on pin 13d has an elongated window with concentric side-faces 17a shaped in circular arcs and which are adapted to slide freely on said sides of the adjusting part 15, the transfer rocker 17 being guided between rim 15a and the projecting rim of plate 16.

Figure 2:
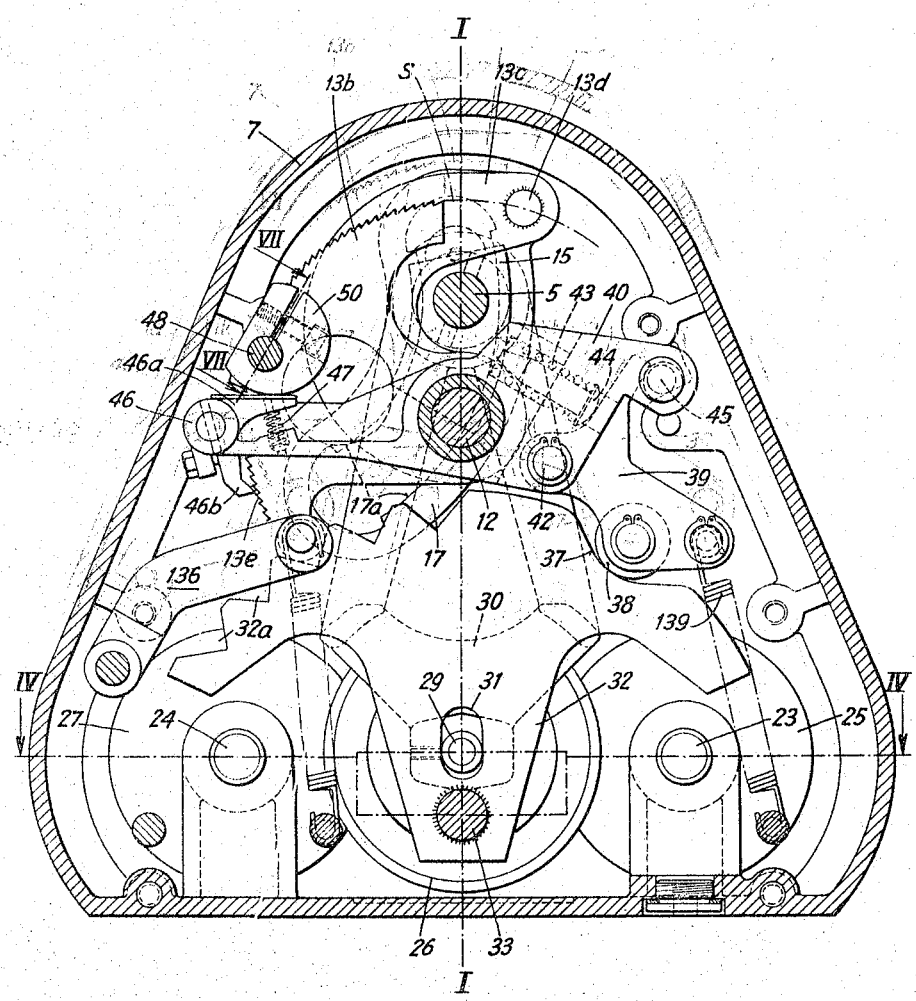
FIG. 2 depicts a cross-section on the line I—I of FIG. 1.
Figure 3:
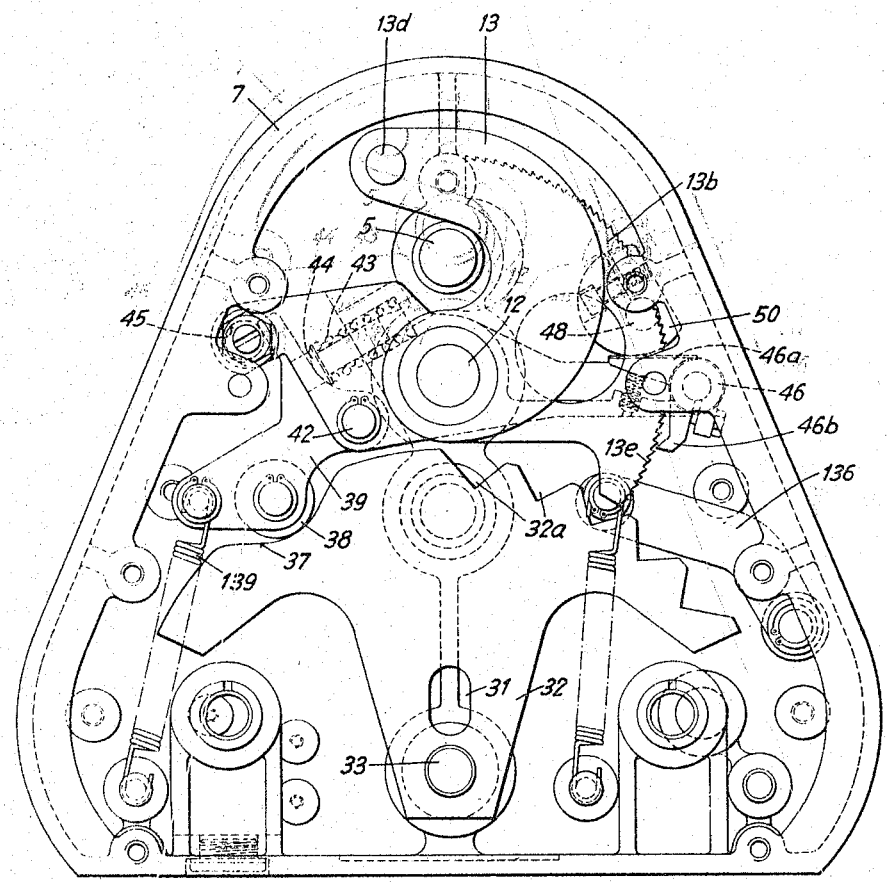
FIG. 3 is a view according to arrow III in FIG. 1 of the assembly situated in the right-hand half portion of FIG. 1.
Figure 6:
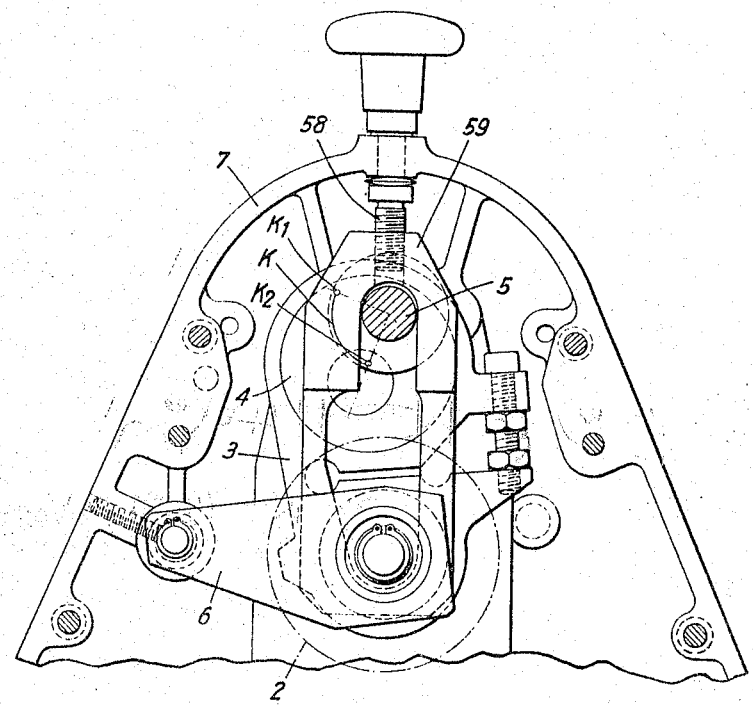
FIG. 6 is a partial view according to arrow VI in FIG. 1, the upper adjusting shaft being shown in section and the upper roll being shown in its lower terminal position.

In FIGS. 1 to 3, the upper roll 2 and the movable parts of the adjusting mechanism just described are shown in the position for maximum roll-gap or nip size (upper roll completely raised), eccentric disc 4 in FIG. 1, however, being plotted wrong. The two ends K1 and K2 of the circular arc K which is defined by the center of said eccentric disc during the upper-roll adjustment, are shown in FIG. 6 in which otherwise the parts 2, 3, 4 and 6 are shown in the lower terminal position of the upper roll 2 in which the gap size is zero.

It may be seen that in the upper terminal position of the upper roll (FIGS. 1 to 3), the circularly curved faces 17a of the transfer rocker 17 and of the adjusting part 15 are substantially at right angles to the circular arc S (FIG. 2) defined by the hinge point between the pin 13d and the rocker 17 as the upper roll 2 is adjusted. This means that at the beginning of the upper-roll setting, a certain amount of angular movement of member 13 (or of handwheel 9 respectively) produces a corresponding great angular movement of part 15 and of shaft 5 thereby providing an elongated initial upper roll adjustment path in accordance with the shape of the arc K at K1.

At the end of the upper-roll adjustment, however, the faces 17a are nearly concentric to arc S, which means that then the same amount of angular movement of member 13 or of handwheel 9 respectively, produces only a slight corresponding angular movement of part 15 and of shaft 5 and in accordance with the shape of arc K of the eccentric disc 4 at K2 it may be seen that only a very slight adjustment of the upper roll then results from said terminal movement of the members 13 or 9.

By reason of such arrangement of the setting or adjusting mechanism, there is obtained over the entire adjustment range a substantially constant roll-off degree W (i.e. the ratio between the roll-gap size after adjustment to the roll-gap size before such adjustment) for a certain adjustment path of handwheel 9 or of member 13 respectively. For example, for the same amount of angular movement of members 9 or 5 there results an adjustment from 30 to 15 millimeters or from 12 to 6 millimeters or from two to one millimeter, i.e. in each case W is equal to ½.

Before describing the automatic upper-roll adjusting means, certain other structural features of the dough-rolling machine shall be briefly mentioned here, even though such features already have been described in detail in the aforesaid British Patent No. 919,750.

Figure 4:
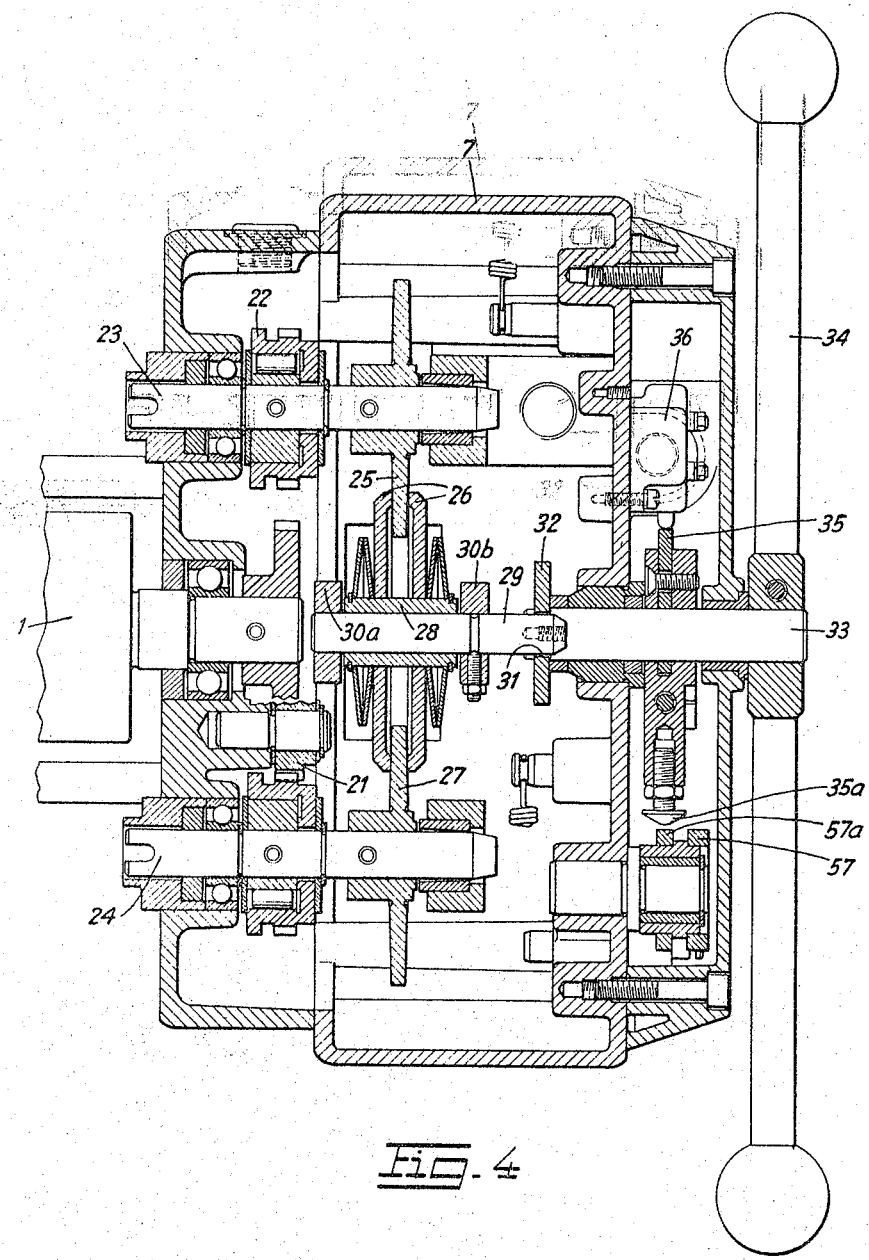
FIG. 4 shows a horizontal section on the line IV—IV of FIG. 2.

The dough-rolling machine operates reversibly, with dough-feeding tables being disposed on both sides of the rolling gap, of which each such table comprises an endless conveyor band. These conveyor bands are driven from the gear wheel fixed to the journal of lower roll 1 via one or the other intermediate gears 21 and one or the other one-way clutches 22 and the drive shaft 23 or 24 as shown in FIGURE 4. Thus, the conveyor band moves at a speed substantially equal to the peripheral speed of the rolls 1 and 2. The drive further is transmitted through a friction-wheel means 26 extending between discs 25 and 27 on the drive shaft 23 or 24 respectively. The conveyor band feeding the dough-lump runs at reduced speed. The friction wheels 26 are mounted on an axle pin 29 by means of a bushing 28. Pin 29 sits in legs 30a, 30b, of a rocker 30 of which part 30c is mounted freely rotatable on the boss of the adjusting part 15. Pin 29 further is engaged in an elongated radial opening 31 of a segment 32 that is fixed to a control shaft 33 together with a two-arm control lever 34 and a cam 35. The latter coacts with an electric change-over switch 36 disposed in the feed circuit of the roll-driving motor so that the latter drives lower roll 1 in the same sense as the operator moves the control means 32–35 from its initial position shown in FIGS. 1 to 5. The segment 32 has catches or notches 32a in which is engageable a roller mounted on a spring-loaded arm 136. The further the control means 32–35 is being deflected, the more the speed of the feeding conveyor band is reduced through the action of the friction gearing, while the rolling speed remains constant.

*Automatic means for adjusting the upper roll*

The segment 32 has on its periphery a recess which acts as a cam portion or cam means 37. This cam means is contacted by a tracer or follower roll 38 that is mounted on a member 39 biased by a spring 139. The member 39 forms part of a pawl-carrying arm assembly which includes a member 40 freely rotatably mounted on a stationary sleeve 41 that is coaxial to shaft 12 and member 13. Said assembly, instead of being rigid, comprises, for a purpose to be explained later, the members 39, 40 which are pivoted to each other on the axle pin 42 and held in the relative positions shown by means of a device comprising a spring 43 and pressure pin 44. An extension of member 39, in such relative position, abuts against a pin 45 fixed to member 40.

At the end remote from the tracer roller 38, said pawl-carrying assembly 39, 40 carries a pawl 46 including a portion 46a and a tooth 46b. The portion 46a is biased by a compression spring 47 braced against the member 40 for the purpose of bringing the pawl tooth 46b into engagement with a serration 13e provided on the circumference of slider part 13b or, respectively, to hold same in such engagement.

Figure 7:
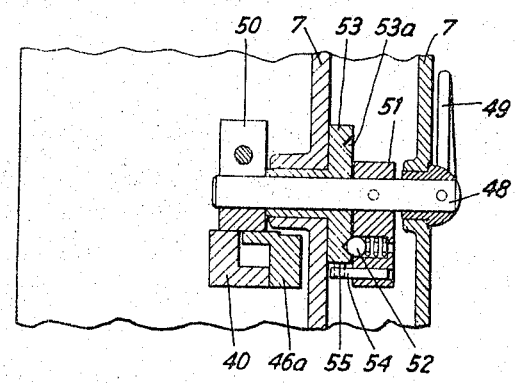
FIG. 7 is a section through a detail on the line VII—VII of FIG. 5.

In the range of movement of pawl member 46a is disposed a device for changing the size of the switching step or, respectively of the roll-off degree W. Such device (see FIGS. 2, 5 and 7) comprises a shaft 48 rotatably mounted on housing 7, on the exterior and interior ends of which are fixed a setting arm 49 and a stop eccentric 50 respectively, the latter being situated above pawl member 46a. An arm 51 fixed to the middle portion of shaft 48 guides a spring-loaded ball 52 which may snap into one or the other of a plurality of countersunk notches 53a of a stationary member 53. Said arm 51 further carries a pin 54 that abuts against one or the other of two stationary stop pins 55 fixed to member 53.

The pivoting angle or swing stroke of the assembly 39, 40 is determined by the shape or height of cam means 37. During a first stroke portion the pawl tooth 46b moves into engagement with the serration 13e, and during the remaining stroke portion it carries along the member 13 through a one step movement. In the setting shown of eccentric 50, said remaining stroke portion is a maximum and thus the stepping path is also a maximum. Thereby the upper roll 2 is adjusted at a relatively great rate, i.e. with a high roll-off degree, at each actuation of the control means 32–35 out of its initial position. The further the stop eccentric 50 is reset from the setting shown toward the other setting, the smaller is the roll-off degree.

In these automatic arrangements for adjusting the upper roll, handwheel 9 is rotated also of course, together with the scale 10 thereof. Thus the operator always may read the size of the roll-gap.

The rolling pressure has the tendency of lifting the upper roll 2, which has to be prevented of course. Accordingly, a blocking device is provided, comprising a ratchet locking wheel 56 with a serrated periphery, a pawl 57 (FIG. 5) pivoted to housing 7 and a spring 58 which always tends to hold the pawl tip in engagement with the peripheral serration of wheel 56 to prevent the latter from turning in the sense of an increase in the roll-gap.

Figure 5:
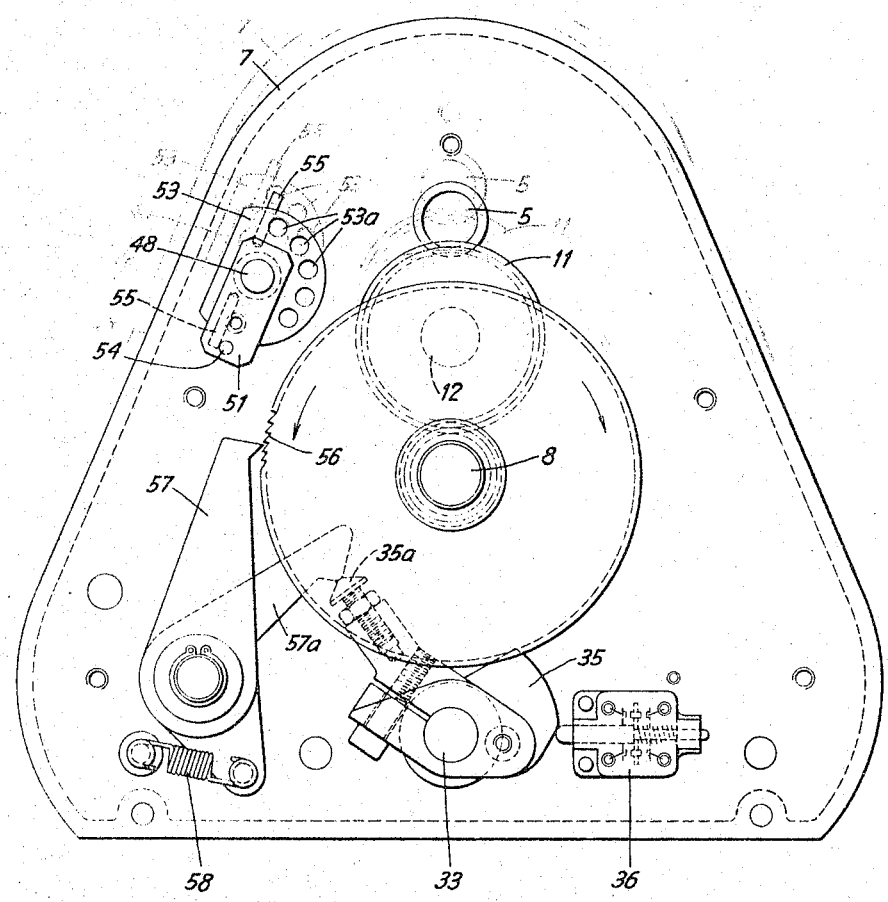
FIG. 5 is a view according to arrow V in FIG. 1, two shafts being shown in section.

After a lump of dough has been rolled, the roll-gap has to be increased by actuating the handwheel 9. To such end, said blocking device has to be rendered ineffective, and this is done each time that the operator returns the control means 32–35 into its initial position. Cam 35 of the control means carries a screw 35a which in said initial position acts on an arm 57a of pawl 57 and lifts the tip thereof from the serration of wheel 56, as shown in FIG. 5.

On the housing 7 is rotatably mounted a setting spindle 58 (FIG. 6) of which the threaded portion carries a framelike component 59 that surrounds the journal of the upper roll 2. This means permits adjustment of the lower terminal position of the upper roll and thus also the minimum roll-gap width. When in the course of an automatic setting, the slide member 13 cannot be turned further, as said minimum roll-gap width has been reached, the control means 32–35 still has to be rocked enough for the machine to run. This means that the cam portion 37 has to be capable of moving the arm 39 of the pawl-carrying assembly through the entire stroke, while the member 40 of said assembly is stopped together with pawl 46. This is the reason for the yielding construction of assembly 39, 40 described above, including the parts 42 to 45.

From the description above it is apparent that for the purpose of operating the machine when the automatic means have been engaged, the operator only has to actuate the control lever 34 in one or the other sense in order to first set the upper roll by a certain amount that corresponds to the roll-off degree preset by means of the device 49 to 51; second to render visible on the handwheel scale 10 the roll-gap width (expressed in millimeters) third to drive the lower roll 1 by the motor in the desired sense (corresponding to the sense of the control-lever actuation) and fourth to drive the conveyor bands in the respective sense, namely the feeding band at a speed that is more or less reduced, depending on the degree of swing of the control lever.

To change or reverse the roll setting from automatic to manual operation, the attendant merely has to turn the setting arm 49 and thereby the stop eccentric 50 through approximately 180° from the position shown to the opposite terminal position. The stop eccentric 50 through its new position also moves angularly the pawl-carrying assembly 39, 40 so that the tracer roll 38 will be lifted from the cam means 37 with the result that no further stepping movement will occur upon actuation of the control means 32–35.

Various changes and modifications are possible on the examples shown and described. Instead of being manually adjustable, the control arm 34 or respectively the control means 32–35 could be servo-actuable, for example in an electromagnetic or hydraulic manner, whereby the respective servomotor may be controllable by a device that is automatically responsive to an event or occurrence. Said control means also could be alternatively actuable manually or by servomotor means.

After reading the foregoing description, the operation of the present invention should become apparent. When the control means 32–35 is operated, through operation of the control lever 34, the cam 35 engages the switch 36 to drive the electric motor coupled with the lower roll 1. This enables dough to be fed through the gap between the rolls 1 and 2. Operation of the control lever 34 also serves to operate the incremental or step-by-step movement mechanism which decreases the gap between the rolls by one step or increment. This occurs through engagement of the cam portion 37 on the member 32 with the cam follower or roller 38, thereby operating the members 39 and 40 to cause the pawl means 46 to step one increment along the teeth 13e on the slider 13. The manually adjustable means 49, 50, 51 can be moved to enable the stop eccentric 50 to vary the quantity of each step or increment. The stop eccentric 50 can also be moved to a position whereat the roller 38 is moved out of engagement with the cam portion 37 so that no further gap decrease will occur, even upon further operation of the control means.

We claim:

1. In a dough rolling machine including a pair of cooperating pressure rollers for rolling the dough, the improvement for adjusting one of said rollers relative to the other, comprising:

electrical drive means for positively rotating at least one of said rollers;

electric switch means connected with said electrical drive means for energizing and de-energizing thereof;

control means selectively movable into and out of engagement with said electric switch means for operation thereof;

means mounting said one roller for adjustment relative to the other of said rollers;

mechanical adjustment means operative to move said one roller relative to said other roller to thereby vary the gap therebetween;

said mechanical adjustment means including incremental movement mechanism which, when activated, incrementally moves said one roller toward said other roller to decrease the gap therebetween;

said control means being controllably coupled with said incremental movement mechanism whereby said mechanism is actuated responsively to movement of said control means;

movement of said control means thereby serving to operate said electric switch means to thereby energize said electrical drive means and hence to rotate a roller to feed dough through said gap between said rollers;

said movement of said control means simultaneously effecting a responsive actuation of said incremental movement mechanism to move said one roller toward said other roller, thereby decreasing the size of said gap by an incremental amount.

2. The improvement defined in claim 1 further including manually adjustable means cooperative with said incremental movement mechanism for varying the incremental amount which said one roller is moved toward said other roller.

3. The improvement defined in claim 2 wherein said manually adjustable means is movable to a selected position which renders said incremental movement mechanism inoperative.

4. The improvement defined in claim 3 wherein said means mounting said one roller includes an eccentric means and wherein said mechanical adjustment means includes an adjusting shaft upon which said eccentric means is mounted and a member for rotating said adjusting shaft whereupon rotation of said member through any angle produces a substantially constant ratio between the roll gap size before rotation and the roll gap size after rotation.

5. The improvement defined in claim 4 wherein said mechanical adjustment means includes an element having a serrated portion, said element being operatively connected with said member for rotating said adjusting shaft, wherein said control means includes a cam portion and wherein said incremental movement mechanism includes a pawl-carrying assembly including a spring loaded pawl means engageable with said serrated portion and a cam follower engageable with said cam portion whereby movement of said control means causes, through engagement of said cam portion and said cam follower, a corresponding movement of said pawl-carrying assembly to advance said pawl means along said serrated portion.

6. The improvement defined in claim 5 wherein said manually adjustable means includes a stop member against which said pawl means abuts whereby adjustment of the position of said stop member correspondingly adjusts the amount of engagement between said pawl means and said serrated portion, movement of said stop member to said selected position moving said pawl-carrying assembly to disengage said cam follower from said cam portion.

7. The improvement defined in claim 5 further including a transmission part pivotally attached with said element, and a setting member fixed to said adjusting shaft, said transmission part being engaged with said setting member whereby movement of said element causes the pivotal attachment with said transmission part to move through a particular path of motion, thereby moving said setting member.

8. The improvement defined in claim 7 wherein said transmission part includes a window having concentric sides in the form of circular arcs and wherein said setting member includes correspondingly formed side faces which slide against said window sides.

9. The improvement defined in claim 8 wherein said window sides are disposed substantially at right angles to said path of motion when said roll-gap is at a maximum, and wherein said window sides are substantially concentric to said path of motion when said roll-gap is reduced to zero.

10. The improvement defined in claim 5 wherein there is further included a ratchet wheel operatively connected with said member for rotating said adjusting shaft, a further spring-loaded pawl means engageable with said ratchet wheel and with said control means whereby said further spring-loaded pawl means engages with said ratchet wheel except when said control means is in its initial position at which time said further spring-loaded pawl means is disengaged from said ratchet wheel to permit the roll-gap to be enlarged.

References Cited by the Examiner

UNITED STATES PATENTS 2,896,485  7/1959  Tiedemann _____ 72—229
3,023,714  3/1962  Seewer _____ 107—12

FOREIGN PATENTS 493,210  4/1938  Great Britain.
919,750  2/1963  Great Britain.

WALTER A. SCHEEL, *Primary Examiner.*

R. W. JENKINS, *Assistant Examiner.*